(12) United States Patent
Lee (10) Patent No.: US 10,574,366 B2
(45) Date of Patent: Feb. 25, 2020

(54) SELF INTERFERENCE CANCELLATION

(71) Applicant: Empire Technology Development LLC, Wilmington, DE (US)

(72) Inventor: Hyoung-Gon Lee, Gyeonggi-do (KR)

(73) Assignee: Empire Technology Development LLC, Wilmington, DE (US)

( * ) Notice: Subject to any disclaimer, the term of this patent is extended or adjusted under 35 U.S.C. 154(b) by 1 day.

(21) Appl. No.: 15/941,130

(22) Filed: Mar. 30, 2018

(65) Prior Publication Data

US 2018/0294895 A1 Oct. 11, 2018

Related U.S. Application Data

(62) Division of application No. 14/888,861, filed as application No. PCT/US2014/034208 on Apr. 15, 2014, now Pat. No. 9,954,625.

(51) Int. Cl.
| | |
|---|---|
| *H04B 1/56* | (2006.01) |
| *H04B 15/02* | (2006.01) |
| *H04B 1/525* | (2015.01) |
| *H04L 5/14* | (2006.01) |

(52) U.S. Cl.
CPC ............. *H04B 15/02* (2013.01); *H04B 1/525* (2013.01); *H04L 5/14* (2013.01)

(58) Field of Classification Search
CPC ............ H04B 15/02; H04B 1/525; H04L 5/14
USPC ......................................... 370/276, 278, 277
See application file for complete search history.

(56) References Cited

U.S. PATENT DOCUMENTS

| | | |
|---|---|---|
| 7,426,249 B2 | 9/2008 | Keaney et al. |
| 8,204,025 B2 | 6/2012 | Cai et al. |
| 8,472,468 B2 | 6/2013 | Takagi et al. |
| 8,509,193 B2 | 8/2013 | Hassan et al. |
| 9,036,749 B2 | 5/2015 | Choi et al. |
| 9,226,200 B2 | 12/2015 | Wong et al. |
| 9,698,860 B2 | 7/2017 | Bharadia et al. |
| 9,832,003 B2 | 11/2017 | Bharadia et al. |
| 2008/0253490 A1 | 10/2008 | Hafeez |
| 2009/0180404 A1 | 7/2009 | Jung et al. |
| 2010/0022201 A1 | 1/2010 | Vandenameele |
| 2010/0142559 A1 | 6/2010 | Hu |
| 2010/0220708 A1 | 9/2010 | Mantravadi et al. |
| 2010/0232324 A1 | 9/2010 | Radunovic et al. |
| 2010/0238932 A1 | 9/2010 | Kliger et al. |
| 2011/0002232 A1 | 1/2011 | Niewczas et al. |
| 2011/0013684 A1 | 1/2011 | Semenov et al. |

(Continued)

FOREIGN PATENT DOCUMENTS

WO 02063786 A1 8/2002

OTHER PUBLICATIONS

Bharadia, D., et al., "Full duplex radios," Proceedings of the ACM SIGCOMM 2013 conference on SIGCOMM, pp. 375-386 (Aug. 12-16, 2013).

(Continued)

*Primary Examiner* — Chuong T Ho
(74) *Attorney, Agent, or Firm* — IP Spring (57) ABSTRACT

A method performed under control of a first device capable of full duplex radio communications may include transmitting a first frame to a second device; estimating a channel response of self interference cancellation (SIC), based, at least in part, on the first frame; and determining whether the estimated channel response is usable.

14 Claims, 6 Drawing Sheets

(56) References Cited

U.S. PATENT DOCUMENTS

| | | | |
|---|---|---|---|
| 2011/0243154 A1 | 10/2011 | Flynn et al. | |
| 2011/0286340 A1 | 11/2011 | Janecek et al. | |
| 2012/0045986 A1 | 2/2012 | Jitsukawa | |
| 2012/0201153 A1 | 8/2012 | Bharadia et al. | |
| 2012/0201173 A1 | 8/2012 | Jain et al. | |
| 2013/0042162 A1 | 2/2013 | Muthu | |
| 2013/0114468 A1* | 5/2013 | Hui | H01Q 3/2611 370/277 |
| 2013/0194984 A1 | 8/2013 | Cheng et al. | |
| 2013/0286903 A1 | 10/2013 | Khojastepour et al. | |
| 2013/0301487 A1 | 11/2013 | Khandani | |
| 2014/0016515 A1 | 1/2014 | Jana et al. | |
| 2014/0059155 A1 | 2/2014 | Boucher et al. | |
| 2014/0334440 A1 | 11/2014 | Wong et al. | |
| 2014/0362838 A1 | 12/2014 | Choi | |
| 2015/0043685 A1 | 2/2015 | Choi et al. | |
| 2015/0195079 A1 | 7/2015 | Gong | |
| 2015/0280893 A1* | 10/2015 | Choi | H04B 1/525 370/281 |
| 2015/0296413 A1* | 10/2015 | Sadek | H04B 1/1027 375/348 |
| 2016/0087779 A1 | 3/2016 | Lee | |
| 2016/0226535 A1* | 8/2016 | Choi | H04B 1/525 |
| 2017/0128735 A1* | 5/2017 | Gustavson | A61N 1/3925 |
| 2017/0155496 A1 | 6/2017 | Khandani | |
| 2017/0264420 A1 | 9/2017 | Bharadia et al. | |
| 2017/0339569 A1 | 11/2017 | Khandani | |

OTHER PUBLICATIONS

Choi, J. II, et al., "Full-Duplex Wireless Design," accessed at https://web.archive.org/web/20140201025815/http://sing.stanford.edu/fullduplex/, aaccessed on Sep. 4, 2015, pp. 3.

International Search Report and Written Opinion for International Application No. PCT/US2014/034208 dated Sep. 10, 2014, pp. 7.

International Search Report and Written Opinion for International Application No. PCT/US2014/33319 dated Sep. 11, 2014, pp. 7.

Jain, M., et al., "Practical, Real-time, Full Duplex Wireless," Proceedings of the 17th annual international conference on Mobile computing and networking, pp. 301-312, (Sep. 19-23, 2011).

Lin, Y. and Wong, V.W.S., "Frame Aggregation and Optimal Frame Size Adaptation for IEEE 802.11n WLANs," IEEE Global Telecommunications Conference, pp. 1-6 (Nov. 27, 2006-Dec. 1, 2006).

Sabharwal, A., "Research Areas," accessed at https://web.archive.org/web/20140314123817/http://www.ece.rice.edu/~ashu/research.html, accessed on Sep. 15, 2015, pp. 3.

Sahai, A., et al., "Pushing the limits of Full-duplex: Design and Real-time Implementation," ArXiv, pp. 1-12 (Jul. 4, 2011).

Srinivasan, K., et al., "Beyond Full Duplex Wireless," Asilomar Conference on Signals, Systems and Computers, pp. 1-5 (Nov. 4-7, 2012).

Zhou, W., et al., "RCTC: Rapid Concurrent Transmission Coordination in Full DuplexWireless Networks," IEEE International Conference on Network Protocols, pp. 1-10 (Oct. 7-10, 2013).

\* cited by examiner

SELF INTERFERENCE CANCELLATION

CROSS-REFERENCE TO RELATED APPLICATIONS

The present application is a divisional application under 35 U.S.C. § 121 of and claims priority under 35 U.S.C. § 120 to U.S. patent application Ser. No. 14/888,861, filed on Nov. 3, 2015, now U.S. Pat. No. 9,954,625, which is a U.S. National Stage filing under 35 U.S.C. § 371 of International Application No. PCT/US2014/034208, filed on Apr. 15, 2014, and entitled "SELF INTERFERENCE CANCELLATION." U.S. patent application Ser. No. 14/888,861 and International Application No. PCT/US2014/034208, including any appendices or attachments thereof, are incorporated herein by reference in their entireties.

BACKGROUND

Duplex communication systems may allow two devices or two nodes to communicate with each other in opposite directions. Duplex communication systems may be widely used in the area of telecommunications and computer networking. Duplex communication systems may include a half-duplex type and a full duplex type. Full-duplex (also known as double-duplex) systems may allow two devices to transmit and receive data between each other, simultaneously.

SUMMARY

In an example, a method performed under control of a first device capable of full duplex radio communications may include transmitting a first frame to a second device; estimating a channel response of self interference cancellation (SIC), based, at least in part, on the first frame; and determining whether the estimated channel response is usable.

In another example, a method performed under control of a device capable of full duplex radio communications may include estimating changes of self interference; determining an interval of re-tuning of self interference cancellation (SIC), based, at least in part, on the estimated changes of self interference; and re-tuning the SIC at the determined interval.

In yet another example, a first device capable of full duplex radio communications may include a transmitter configured to transmit a first frame to a second device; and a self interference cancellation controller configured to: estimate a channel response of self interference cancellation (SIC), based, at least in part, on the first frame, and determine whether the estimated channel response is usable.

In yet another example, a device capable of full duplex radio communications may include a self interference change estimator configured to estimate changes of self interference; an interval manager configured to determine an interval of re-tuning of self interference cancellation (SIC), based, at least in part, on the estimated changes of self interference; and a self interference cancellation manager configured to re-tune the SIC at the determined interval.

In yet another example, a computer-readable storage medium may store thereon computer-executable instructions that, in response to execution, cause a first device capable of full duplex radio communications to perform operations including transmitting a first frame to a second device; estimating a channel response of self interference cancellation (SIC), based, at least in part, on the first frame; receiving a second frame from the second device within a predefined time after the transmission of the first frame; and determining that the estimated channel response is usable.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. With the understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to full duplex radio communications. Technologies are generally described for schemes for determining an interval of re-tuning of self interference cancellation and for re-tuning self interference cancellation for full duplex radio communications.

In some examples, a first device may be configured to transmit a first frame to a second device. The first device may be a device which is capable of full duplex radio communications, and the second device may be a device which is capable of full duplex radio communications or half duplex radio communications. Further, the first frame may refer to a frame which is defined with the IEEE 802.11 standard, such as a data frame, a data packet, a probe request frame, etc. The first device may be configured to receive the first frame, since the first device is capable of full duplex radio communications. The first device may be further configured to estimate a channel response of self interference cancellation (SIC), based at least in part on the first frame. For example, but not as a limitation, the first device may be configured to the channel response of self interference cancellation, based at least in part on header information of the first frame, which the first device has already known as a reference signal for channel estimation.

Further, the first device may be configured to determine whether the estimated channel response of self interference cancellation is usable. In some embodiments, the first device may be configured to determine that the estimated channel response of self interference cancellation is reliable, when the first device receives a second frame from the second device within a predefined time after the first device transmitted the first frame. For example, but not as a limitation, the second frame may include an acknowledge (ACK) frame or a probe response frame, which may confirm successful transmission of the first frame. The first device may be configured to confirm that a channel is occupied only by the first device, when the first device receives the second frame from the second device. Further, the first device may be configured to update a channel response of self interference cancellation with the estimated channel response of SIC, which is determined to be usable, so the first device may be configured to re-tune self interference cancellation for full duplex radio communications. Further, the first device may then be configured to perform self interference cancellation, based on the estimated channel response of self interference cancellation.

Meanwhile, the first device may be configured to determine that the estimated channel response of self interference cancellation is unusable, if the first device receives no frame or signal from the second device within the predefined time after the first device transmitted the first frame. The first device may then be configured to discard the unusable estimated channel response of self interference cancellation.

Figure 1:
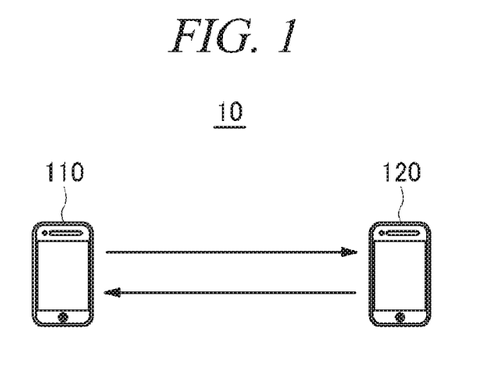
FIG. 1 schematically shows an illustrative example of a full duplex radio communication environment including a first device and a second device, arranged in accordance with at least some embodiments described herein.

FIG. 1 schematically shows an illustrative example of a full duplex radio communication environment 10 including a first device 110 and a second device 120, arranged in accordance with at least some embodiments described herein. A network (not illustrated) may be configured to connect first device 110 and second device 120. The network may refer to a component or module that may be configured to communicatively couple first device 110 and second device 120. Non-limiting examples of the network may include a wired network such as a LAN (Local Area Network), a WAN (Wide Area Network), a VAN (Value Added Network) or the like, or various other wireless networks such as a mobile radio communication network including at least one of a 3rd generation (3G) mobile telecommunications network, a 4th or 5th generation mobile telecommunications network, various other mobile telecommunications networks, a satellite network, WiBro (Wireless Broadband Internet), Mobile WiMAX, HSDPA (High Speed Downlink Packet Access), or the like. Alternatively, the network may include at least one of a near field communication (NFC), Bluetooth, or peer to peer (P2P) communication protocol.

For example, but not as a limitation, respective one of first device 110 and second device 120 may refer to at least one of a smart phone, a portable device, a notebook computer, a tablet device, a phablet device, a personal computer or a personal communication terminal, such as PCS (Personal Communication System), GMS (Global System for Mobile communications), PDC (Personal Digital Cellular), PDA (Personal Digital Assistant). In some embodiments, respective one of first device 110 and second device 120 may be a Wi-Fi access point or a base station for a mobile telecommunications network such as a 3rd generation (3G) mobile telecommunications network or a 4th generation (4G) mobile telecommunications network. First device 110 may be capable of full duplex radio communications, and second device 120 may be capable of full duplex radio communications or half duplex radio communications.

In some embodiments, first device 110 may be configured to monitor an environment associated with first device 110. For example, first device 110 may be configured to detect a movement of first device 110, and to estimate a degree of the movement of first device 110. For example, but not as a limitation, first device 110 may be configured to calculate an amount of changes on at least one of a location, a moving direction or a moving speed of first device 110 by using a sensor or a GPS (global positioning system) coupled to first device 110. First device 110 may then be configured to estimate the degree of the movement, based at least in part on the calculated amount of changes on the movement. For another example, first device 110 may be configured to detect a change on an environment in the vicinity of first device 110. For example, but not as a limitation, first device 110 may be configured to calculate a distance between first device 110 and an object (e.g., an ear of a user of first device 110) around first device 110, and to calculate an amount of changes on the distance, periodically. First device 110 may then be configured to detect the change on the environment of first device 110, based at least in part on the calculated amount of changes on the distance between first device 110 and the object around first device 110.

Further, first device 110 may be configured to estimate changes of self interference. In some embodiments, first device 110 may be configured to estimate changes of self interference at a predefined interval or in real time. In some embodiments, first device 110 may be configured to estimate changes of self interference, based at least in part on the estimated degree of movement of first device 110. In some other embodiments, first device 110 may be configured to estimate changes of self interference, based at least in part on the detected change on the environment of first device 110.

Further, first device 110 may be configured to determine an interval of re-tuning of self interference cancellation (SIC), based at least in part on the estimated changes of self interference. For example, first device 110 may be configured to increase the interval of re-tuning of self interference cancellation, when the changes of self interference decrease. Thus, re-tuning of self interference cancellation may be executed at a relatively longer interval, if the degree of movement of first device 110 or the change on the environment around first device 110 decreases. Alternatively and/or additionally, first device 110 may be configured to decrease the interval of re-tuning of self interference cancellation, when the changes of self interference increase. Thus, re-tuning of self interference cancellation may be executed at a relatively shorter interval, if the degree of movement of first device 110 or the change on the environment around first device 110 increases.

Further, first device 110 may be configured to update and adjust a present interval of re-tuning of self interference cancellation with the determined interval of re-tuning of self interference cancellation.

Further, first device 110 may be configured to re-tune self interference cancellation at the updated determined interval of re-tuning of self interference cancellation. In some embodiments, first device 110 may be configured to transmit a first frame to second device 120 via the network after first device 110 sensed that a channel is clear. For example, but not as a limitation, the first frame may be a frame which is defined with the IEEE 802.11 standard, such as a data frame, a data packet, a probe request frame, etc. Since first device 110 is capable of the full duplex radio communications, first device 110 may be further configured to receive the first frame. Further, first device 110 may be configured to estimate a channel response of self interference cancellation, based at least in part on the first frame. For example, first device 110 may be configured to calculate and/or determine coefficients for estimating self interference and canceling the estimated self interference. For example, but not as a limitation, first device 110 may be configured to estimate the channel response of self interference cancellation, based on header information of the first frame, which first device 110 has already known as a reference signal for channel estimation. Non-limiting examples of the header information may include a length of the first frame, a source address of the first frame or a destination address of the first frame.

Further, first device 110 may be configured to determine whether the estimated channel response of self interference cancellation is usable. In some embodiments, first device 110 may be configured to determine that the estimated channel response of self interference cancellation is reliable, when first device 110 receives a second frame from second device 120 within a predefined time after first device 110 transmitted the first frame. For example, but not as a limitation, the second frame may refer to an acknowledge (ACK) frame or a probe response frame, which may confirm successful transmission of the first frame. First device 110 may be configured to confirm that the channel is occupied only by first device 110, when first device 110 receives the second frame from second device 120. Further, first device 110 may be configured to update and/or adjust a present channel response of self interference cancellation with the estimated channel response of self interference cancellation, which is determined to be usable. Thus, first device 110 may be configured to re-tune self interference cancellation for full duplex radio communications.

In some other embodiments, first device 110 may be configured to determine that the estimated channel response of self interference cancellation is unusable, if first device 110 receives no frame or signal from second device 120 within the predefined time after first device 110 transmitted the first frame. First device 110 may then be configured to discard the unusable estimated channel response of self interference cancellation.

Further, first device 110 may then be configured to perform self interference cancellation to a signal which is received by first device 110 after first device 110 received the second frame, based on the usable estimated channel response of self interference cancellation. In some embodiments, first device 110 may be configured to estimate self interference based on the usable estimated channel response, and to generate the estimated self interference. First device 110 may then be further configured to subtract the generated self interference from the received signal.

Figure 2:
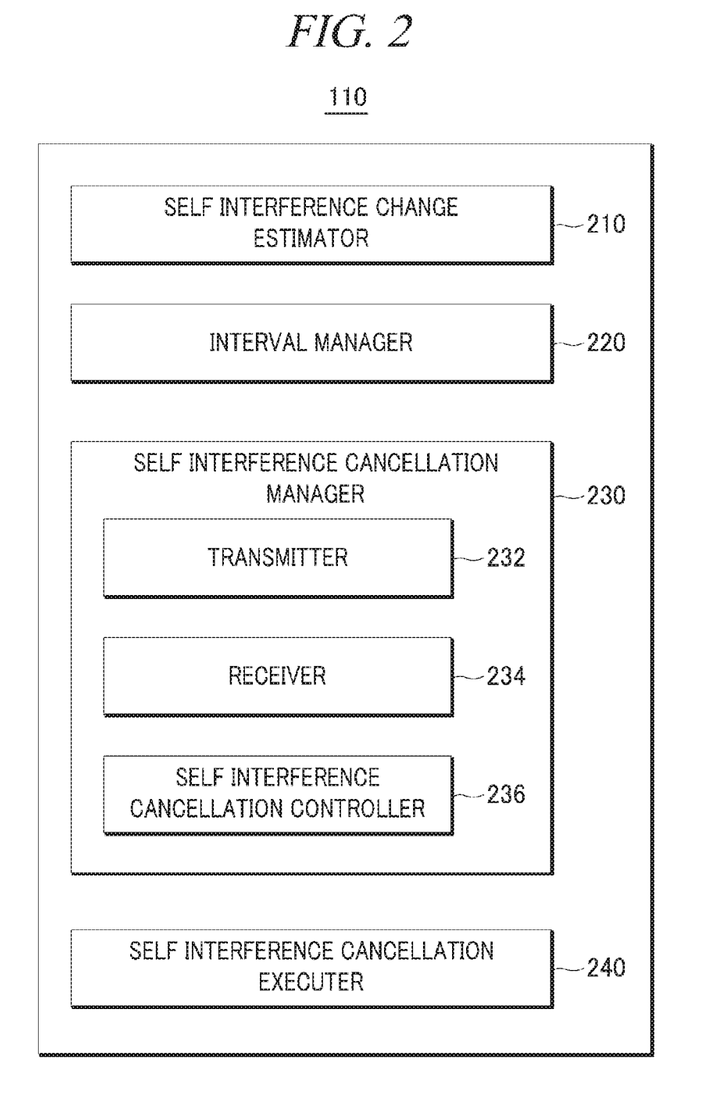
FIG. 2 shows a schematic block diagram illustrating an example architecture for a device, arranged in accordance with at least some embodiments described herein.

FIG. 2 shows a schematic block diagram illustrating an example architecture for a device, arranged in accordance with at least some embodiments described herein. As depicted in FIG. 2, for example, first device 110 may include a self interference change estimator 210, an interval manager 220, a self interference cancellation manager 230 and a self interference cancellation executer 240. Further, self interference cancellation manager 230 may include a transmitter 232, a receiver 234, and a self interference cancellation controller 236. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of self interference change estimator 210, interval manager 220, self interference cancellation manager 230 and self interference cancellation executer 240 may be included in an instance of an application hosted on first device 110.

Self interference change estimator 210 may be configured to monitor an environment associated with first device 110. In some embodiments, self interference change estimator 210 may be configured to detect a movement of first device 110, and to estimate a degree of the movement of first device 110. For example, but not as a limitation, self interference change estimator 210 may be configured to calculate an amount of changes on at least one of a location, a moving direction or a moving speed of first device 110 by using a sensor or a GPS (global positioning system) coupled to first device 110. Self interference change estimator 210 may then be configured to estimate the degree of the movement based at least in part on the calculated amount of changes on the movement. In some other embodiments, self interference change estimator 210 may be configured to detect a change on an environment in the vicinity of first device 110. For example, but not as a limitation, self interference change estimator 210 may be configured to calculate a distance between first device 110 and an object (e.g., an ear of a user of first device 110) around first device 110, and to calculate an amount of changes on the distance. Self interference change estimator 210 may then be configured to detect the change on the environment of first device 110, based at least in part on the calculated amount of changes on the distance between first device 110 and the object around first device 110.

Further, self interference change estimator 210 may be configured to estimate changes of self interference. For example, self interference change estimator 210 may be configured to estimate changes of self interference at a predefined interval or in real time. In some embodiments, self interference change estimator 210 may be configured to estimate changes of self interference, based at least in part on the estimated degree of movement of first device 110. In some other embodiments, self interference change estimator 210 may be configured to estimate changes of self interference, based at least in part on the detected change on the environment of first device 110.

Further, interval manager 220 may be configured to determine an interval of re-tuning of self interference cancellation, based at least in part on the changes of self interference, which is estimated by self interference change estimator 210. For example, interval manager 220 may be configured to increase the interval of re-tuning of self interference cancellation, when the changes of self interference decrease. Thus, re-tuning of self interference cancellation may be executed at a relatively longer interval, if the degree of movement of first device 110 or the change on the environment around first device 110 decreases. Alternatively, interval manager 220 may be configured to decrease the interval of re-tuning of self interference cancellation, when the changes of self interference increase. Thus, re-tuning of self interference cancellation may be executed at a relatively shorter interval, if the degree of movement of first device 110 or the change on the environment around first device 110 increases.

Further, interval manager 220 may be configured to update and/or adjust a present interval of re-tuning of self interference cancellation with the determined interval of re-tuning of self interference cancellation.

Further, self interference cancellation manager 230 may be configured to re-tune self interference cancellation at the determined interval of re-tuning of self interference cancellation. In some embodiments, transmitter 232 may be configured to transmit a first frame to second device 120. For example, the first frame may be a frame which is defined with the IEEE 802.11 standard, such as a data frame, a data packet, a probe request frame, etc.

Further, receiver 234 may be configured to receive a second frame from second device 120 within a predefined time after transmitter 232 transmitted the first frame. For example, but not as a limitation, the second frame may include an acknowledge (ACK) frame or a probe response frame, which may confirm successful transmission of the first frame.

Further, self interference cancellation controller 236 may be configured to estimate a channel response of self interference cancellation, based at least in part on the first frame. For example, self interference cancellation controller 236 may be configured to calculate and/or determine coefficients for estimating self interference and canceling the estimated self interference in a received signal. For example, but not as a limitation, self interference cancellation controller 236 may be configured to estimate the channel response of self interference cancellation, based on header information of the first frame, which first device 110 has already known as a reference signal for channel estimation. Non-limiting examples of the header information may include a length of the first frame, a source address of the first frame or a destination address of the first frame.

Further, self interference cancellation controller 236 may be configured to determine whether the estimated channel response of self interference cancellation is usable. In some embodiments, self interference cancellation controller 236 may be configured to determine that the estimated channel response of self interference cancellation is usable, if receiver 234 receives the second frame from second device 120 within the predefined time after transmitter 232 transmitted the first frame. Further, self interference cancellation controller 236 may be configured to update and/or adjust a present channel response of self interference cancellation with the usable estimated channel response of self interference cancellation. Thus, self interference cancellation manager 230 may be configured to re-tune self interference cancellation for full duplex radio communications.

In some other embodiments, self interference cancellation controller 236 may be configured to determine that the estimated channel response of self interference cancellation is unusable, if receiver 234 receives no frame or signal from second device 120 within the predefined time after transmitter 232 transmitted the first frame. Self interference cancellation controller 236 may then be configured to discard the unusable estimated channel response of self interference cancellation.

Further, self interference cancellation executer 240 may be configured to execute and/or perform self interference cancellation to a signal which is received by receiver 234 after receiver 234 received the second frame, based on the usable estimated channel response of self interference cancellation. In some embodiments, self interference cancellation executer 240 may be configured to estimate self interference based on the usable estimated channel response, and to generate the estimated self interference. Self interference cancellation executer 240 may then be further configured to subtract the generated self interference from the received signal.

Figure 3:
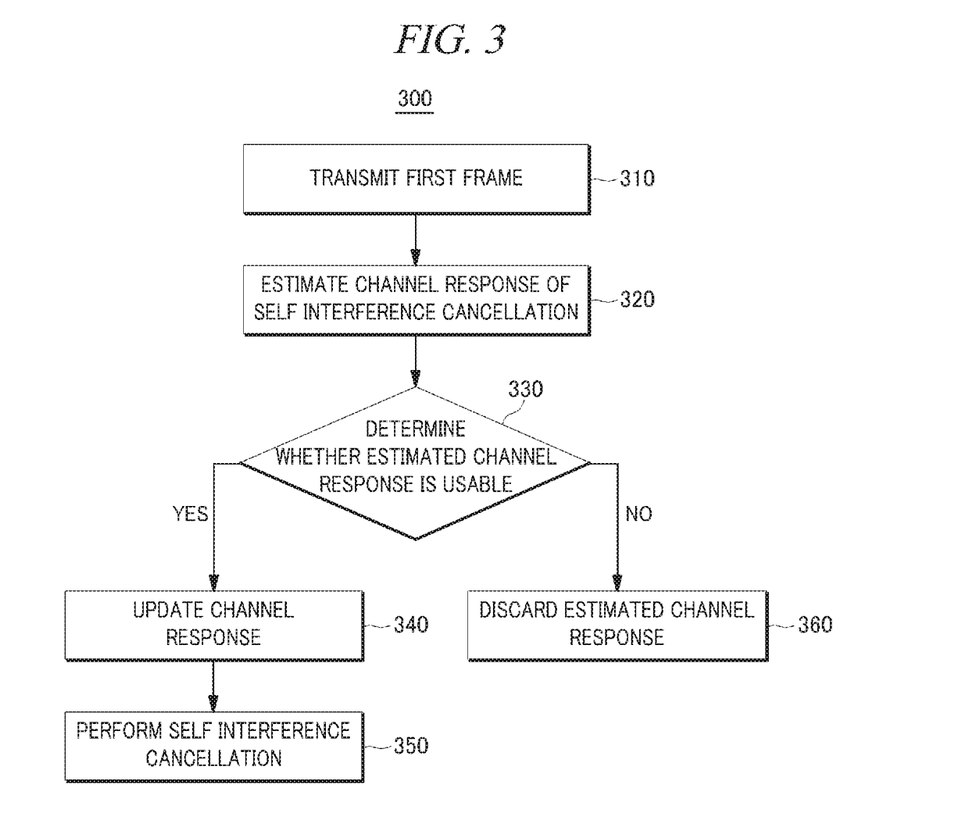
FIG. 3 shows an example flow diagram of a process for re-tuning self interference cancellation, arranged in accordance with at least some embodiments described herein.

FIG. 3 shows an example flow diagram of a process 300 for re-tuning self interference cancellation, arranged in accordance with at least some embodiments described herein. The operations of process 300 may be implemented in full duplex radio communication environment 10 including first device 110 and second device 120, as illustrated in FIG. 1. Process 300 may include one or more operations, actions, or functions as illustrated by one or more blocks 310, 320, 330, 340, 350 and/or 360. Although illustrated as discrete blocks, various blocks may be divided into additional blocks, combined into fewer blocks, or eliminated, depending on the desired implementation. Processing may begin at block 310.

At block 310 (Transmit First Frame), first device 110 may transmit a first frame to second device 120. For example, but not as a limitation, the first frame may be a frame which is defined with the IEEE 802.11 standard, such as a data frame, a data packet, a probe request frame, etc. Processing may proceed from block 310 to block 320.

At block 320 (Estimate Channel Response of Self Interference Cancellation), first device 110 may estimate a channel response of self interference cancellation, based at least in part on the first frame. Since first device 110 is capable of the full duplex radio communications, first device 110 may receive the first frame transmitted at block 310, and estimate a channel response of self interference cancellation, based at least in part on the received first frame as a reference signal for channel estimation. For example, first device 110 may calculate and/or determine coefficients for estimating self interference and canceling the estimated self interference. Processing may proceed from block 320 to block 330.

At block 330 (Determine Whether Estimated Channel Response is Usable), first device 110 may determine whether the channel response of self interference cancellation, which is estimated at block 320, is usable. In some embodiments, first device 110 may determine that the estimated channel response of self interference cancellation is usable, if first device 110 receives a second frame from second device 120 within a predefined time after first device 110 transmitted the first frame. For example, but not as a limitation, the second frame may include an acknowledge (ACK) frame or a probe response frame, which may confirm successful transmission of the first frame. Alternatively, first device 110 may determine that the estimated channel response of self interference cancellation is unusable, if first device 110 receives no frame or signal from second device 120 within the predefined time after first device 110 transmitted the first frame. If first device 110 determines that the estimated channel response of self interference cancellation is usable, processing may proceed to block 340, while otherwise, processing may proceed to block 360.

At block 340 (Update Channel Response), first device 110 may update and adjust a present channel response of self interference cancellation with the estimated channel response of self interference cancellation, which is determined to be usable at block 330. Thus, first device 110 may re-tune self interference cancellation for full duplex radio communications. Processing may proceed from block 340 to block 350.

At block 350 (Perform Self Interference Cancellation), first device 110 may perform self interference cancellation to a signal which is received by first device 110 after first device 110 received the second frame, based on the updated channel response of self interference cancellation. In some embodiments, first device 110 may estimate self interference based on the usable channel response, and may generate the estimated self interference. Further, first device 110 may subtract the generated self interference from the received signal.

At block 360 (Discard Estimated Channel Response), first device 110 may discard the estimated channel response of self interference cancellation, which is determined to be unusable at block 330.

Figure 4:
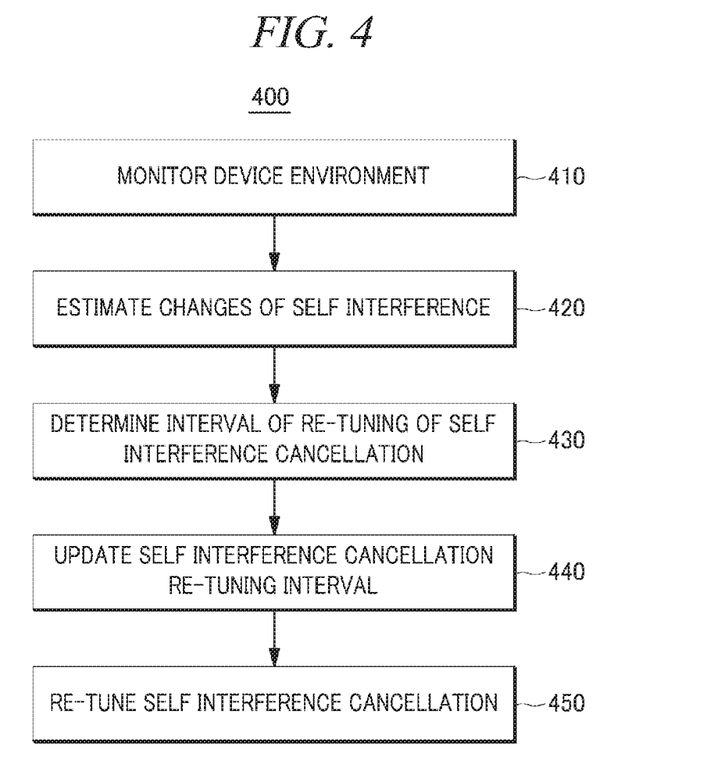
FIG. 4 shows an example flow diagram of a process for determining an interval of re-tuning of self interference cancellation, arranged in accordance with at least some embodiments described herein.

FIG. 4 shows an example flow diagram of a process 400 for determining an interval of re-tuning of self interference cancellation, arranged in accordance with at least some embodiments described herein. The operations of process 400 may be implemented in full duplex radio communication environment 10 including first device 110 and second device 120, as illustrated in FIG. 1. Process 400 may include one or more operations, actions, or functions as illustrated by one or more blocks 410, 420, 430, 440 and/or 450. Although illustrated as discrete blocks, various blocks may be divided into additional blocks, combined into fewer blocks, or eliminated, depending on the desired implementation. Processing may begin at block 410.

At block 410 (Monitor Device Environment), first device 110 may monitor an environment associated with first device 110. In some embodiments, first device 110 may detect a movement of first device 110 and estimate a degree of the movement of first device 110. For example, but not as a limitation, first device 110 may calculate amounts of changes on at least one of a location, a moving direction or a moving speed of first device 110 by using a sensor or a GPS (global positioning system) coupled to first device 110. Further, first device 110 may estimate the degree of the movement of first device 110 based on the calculated amounts of changes on at least one of the location, the moving direction or the moving speed of first device 110. In some other embodiments, first device 110 may detect a change on an environment in the vicinity of first device 110. For example, but not as a limitation, first device 110 may calculate a distance between first device 110 and an object (e.g., an ear of a user of first device 110) around first device 110. Further, first device 110 may detect the change on the environment of first device 110, based at least in part on the distance between first device 110 and the object around first device 110. Processing may proceed from block 410 to block 420.

At block 420 (Estimate Changes of Self Interference), first device 110 may estimate changes of self interference. For example, first device 110 may estimate changes of self interference at a predefined interval or in real time. In some embodiments, first device 110 may estimate changes of self interference, based at least in part on the degree of movement of first device 110, which is estimated at block 410. In some other embodiments, first device 110 may estimate changes of self interference, based at least in part on the change on the environment of first device 110, which is detected at block 410. Processing may proceed from block 420 to block 430.

At block 430 (Determine Interval of Re-tuning of Self Interference Cancellation), first device 110 may determine an interval of re-tuning of self interference cancellation, based at least in part on the changes of self interference, which is estimated at block 420. In some embodiments, first device 110 may increase the interval of re-tuning of self interference cancellation, when the changes of self interference decrease. Thus, re-tuning of self interference cancellation may be executed at a relatively longer interval, if the degree of movement of first device 110 or the change on the environment around first device 110 decreases. Alternatively, first device 110 may decrease the interval of re-tuning of self interference cancellation, when the changes of self interference increase. Thus, re-tuning of self interference cancellation may be executed at a relatively shorter interval, if the degree of movement of first device 110 or the change on the environment around first device 110 increases. Processing may proceed from block 430 to block 440.

At block 440 (Update Self Interference Cancellation Re-tuning Interval), first device 110 may update and adjust a present interval of re-tuning of self interference cancellation with the interval of re-tuning of self interference cancellation, which is determined at block 430. Processing may proceed from block 440 to block 450.

At block 450 (Re-tune Self Interference Cancellation), first device 110 may re-tune self interference cancellation at the interval of re-tuning of self interference cancellation, which is updated at block 440. In some embodiments, first device 110 may re-tune self interference cancellation in the manner described above with reference to FIG. 3.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
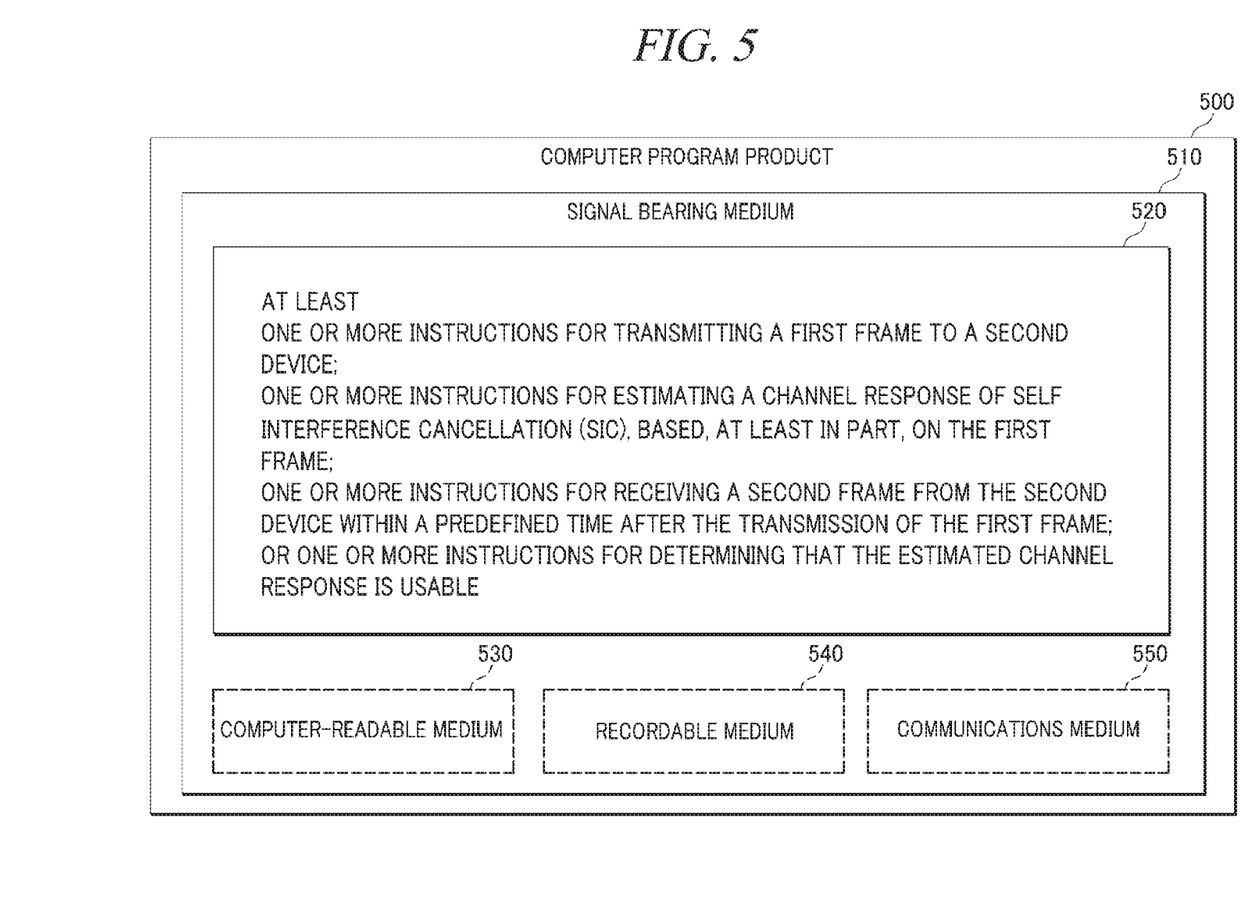
FIG. 5 illustrates computer program products that may be utilized to provide a scheme for re-tuning self interference cancellation, arranged in accordance with at least some embodiments described herein.

FIG. 5 illustrates computer program products that may be utilized to provide a scheme for re-tuning self interference cancellation, arranged in accordance with at least some embodiments described herein. Program product 500 may include a signal bearing medium 510. Signal bearing medium 510 may include one or more instructions 520 that, when executed by, for example, a first device capable of full duplex radio communications, may provide the functionality described above with respect to FIGS. 1-4. By way of example, instructions 520 may include: one or more instructions for transmitting a first frame to a second device; one or more instructions for estimating a channel response of self interference cancellation (SIC), based, at least in part, on the first frame; one or more instructions for receiving a second frame from the second device within a predefined time after the transmission of the first frame; or one or more instructions for determining that the estimated channel response is usable. Thus, for example, referring to FIG. 2, first device 110 may undertake one or more of the blocks shown in FIG. 3 in response to instructions 520.

In some implementations, signal bearing medium 510 may encompass a computer-readable medium 530, such as, but not limited to, a hard disk drive, a CD, a DVD, a digital tape, memory, etc. In some implementations, signal bearing medium 510 may encompass a recordable medium 540, such as, but not limited to, memory, read/write (R/W) CDs, R/W DVDs, etc. In some implementations, signal bearing medium 510 may encompass a communications medium 550, such as, but not limited to, a digital and/or an analog communication medium (e.g., a fiber optic cable, a waveguide, a wired communications link, a wireless communication link, etc.). Thus, for example, program product 500 may be conveyed to one or more modules of first device 110 by an RF signal bearing medium 510, where the signal bearing medium 510 is conveyed by a wireless communications medium 550 (e.g., a wireless communications medium conforming with the IEEE 802.11 standard).

Figure 6:
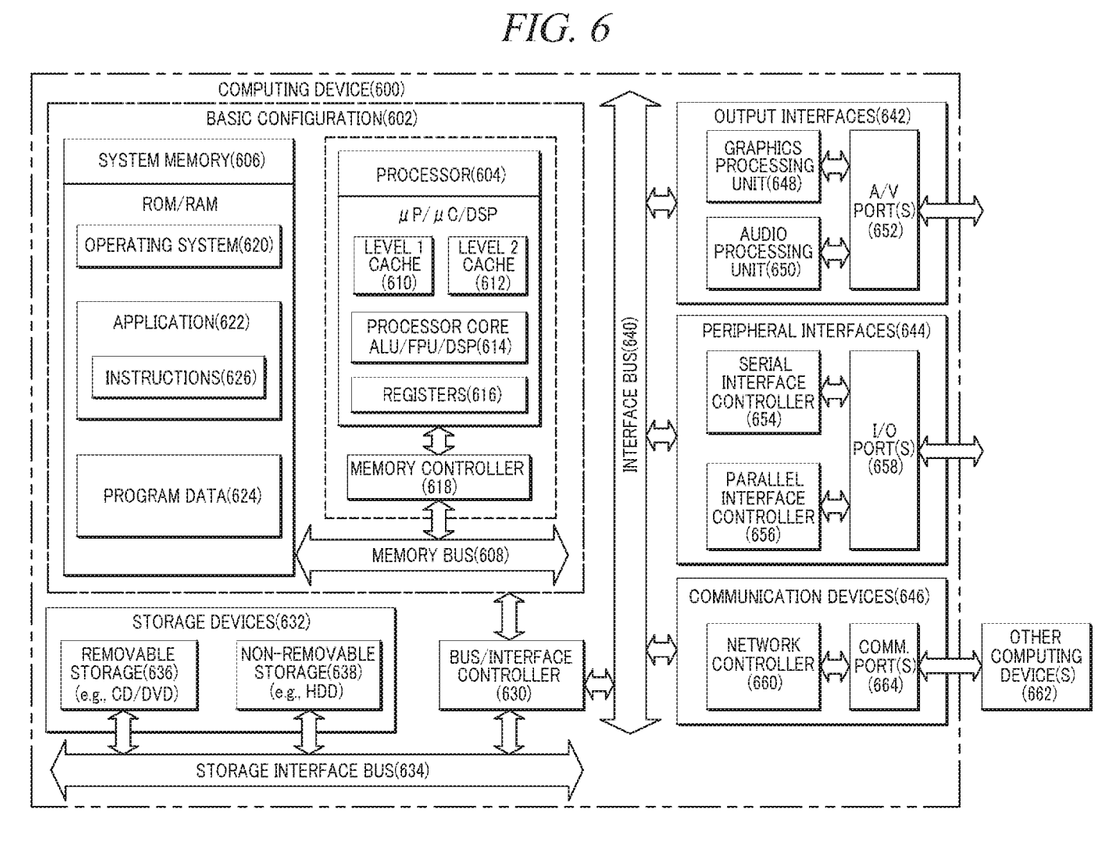
FIG. 6 is a block diagram illustrating an example computing device that may be utilized to provide a scheme for re-tuning self interference cancellation, arranged in accordance with at least some embodiments described herein.

FIG. 6 is a block diagram illustrating an example computing device that may be utilized to provide a scheme for re-tuning self interference cancellation, arranged in accordance with at least some embodiments described herein. In these examples, elements of computing device 600 may be arranged or configured for a device. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, an application 622, and program data 624. Application 622 may include instructions 626 that may be arranged to perform the functions as described herein including the actions described with respect to first device 110 architecture as shown in FIG. 2 or including the actions described with respect to the flow charts shown in FIGS. 3-4. In some examples, application 622 may be arranged to operate with program data 624 on an operating system 620 such that the schemes for determining an interval of re-tuning of self interference cancellation and re-tuning self interference cancellation for full duplex radio communications.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output interfaces 642, peripheral interfaces 644, and communication devices 646) to basic configuration 602 via bus/interface controller 630. Example output interfaces 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a device capable of full duplex radio communications, the method comprising:
    estimating a change of self interference;
    determining an interval of re-tuning of self interference cancellation (SIC),
    wherein the determining the interval of re-tuning of the SIC is based at least in part on the estimated change of the self interference, and
    wherein the determining the interval of the SIC includes at least one of:
        decreasing the interval of re-tuning of the SIC, in response to the estimated change of self interference being indicative of an increase of the self interference, or
        increasing the interval of re-tuning of the SIC, in response to the estimated change of self interference being indicative of a decrease of the self interference; and
    re-tuning the SIC after the determined interval.

2. The method of claim 1, further comprising:
    estimating a degree of movement of the device,
    wherein the estimating the change of the self interference is based on the estimated degree of movement of the device.

3. The method of claim 2, wherein the estimating the degree of movement of the device is based on at least one of a location of the device or a direction of the movement.

4. The method of claim 1, further comprising:
detecting a change in an environment of the device,
wherein the estimating the change of the self interference is based on the detected change in the environment of the device.

5. The method of claim 4, wherein the detecting the change in the environment of the device is based on a distance between the device and an object near the device.

6. A device capable of full duplex radio communications, the device comprising:
a transceiver capable to perform simultaneous signal transmission and signal reception;
a self interference change estimator coupled to the transceiver and operable to estimate a change of self interference based on a signal transmitted by the transceiver and a corresponding signal received by the transceiver;
an interval manager coupled to the self interference change estimator and operable to determine an interval of re-tuning of self interference cancellation (SIC),
wherein the determination of the interval of re-tuning of the SIC is based at least in part on the estimated change of self interference, and
wherein the determination of the interval of the SIC includes at least one of:
a decrease of the interval of re-tuning of the SIC, in response to the estimated change of self interference being indicative of an increase of the self interference, or
an increase of the interval of re-tuning of the SIC, in response to the estimated change of self interference being indicative of a decrease of the self interference; and
a self interference cancellation manager coupled to the interval manager and operable to re-tune the SIC after the determined interval.

7. The device of claim 6, wherein:
the self interference change estimator is further operable to estimate a degree of movement of the device, and
the self interference change estimator is operable to estimate the change of self interference based on the estimated degree of movement of the device.

8. The device of claim 7, wherein the self interference change estimator is operable to estimate the degree of movement of the device based on at least one of: a location of the device, a direction of the movement of the device, or a speed of the movement of the device.

9. The device of claim 6, wherein:
the self interference change estimator is further operable to detect a change in an environment of the device, and
the self interference change estimator is operable to estimate the change of self interference based on the detected change in the environment of the device.

10. The device of claim 9, wherein the self interference change estimator is operable to detect the change in the environment of the device based on a distance between the device and an object near the device.

11. A non-transitory computer-readable medium having stored thereon computer-executable instructions, which in response to execution by a processors, cause a device capable of full duplex radio communications to perform operations comprising:
monitoring an environment of the device for a change in the environment;
detecting, based on the monitoring, a change in the environment of the device;
estimating, based on the detected change in the environment of the device, a change of self interference;
adjusting an interval of re-tuning of self interference cancellation (SIC) from a first interval to a second interval different from the first interval,
wherein the adjusting the interval of re-tuning of the SIC is based on the estimated change of the self interference, and
wherein the adjusting the interval of re-tuning of the SIC includes at least one of:
decreasing the interval of re-tuning of the SIC, in response to an increase of the self interference, or
increasing the interval of re-tuning of the SIC, in response to a decrease of the self interference; and
re-tuning the SIC after the second interval.

12. The non-transitory computer-readable medium of claim 11, wherein the change in the environment of the device includes a change of a distance between the device and an object near the device.

13. The non-transitory computer-readable medium of claim 12, wherein the object near the device includes an ear of a user of the device.

14. The non-transitory computer-readable medium of claim 11, wherein the detecting the change in the environment of the device includes detecting a change in at least one of: a location of the device, a movement direction of the device, or a movement speed of the device.

* * * * *